(12) United States Patent
Parameshwaran et al.

(10) Patent No.: US 11,176,269 B2
(45) Date of Patent: Nov. 16, 2021

(54) ACCESS CONTROL OF SPECIFIC ENCRYPTED DATA SEGMENT

(71) Applicant: INTERNATIONAL BUSINESS MACHINES CORPORATION, Armonk, NY (US)

(72) Inventors: Pradeep Parameshwaran, Boeblingen (DE); Qais Noorshams, Boeblingen (DE); Marco Selig, Boeblingen (DE); Eric Kass, Mannheim (DE)

(73) Assignee: International Business Machines Corporation, Armonk, NY (US)

( * ) Notice: Subject to any disclaimer, the term of this patent is extended or adjusted under 35 U.S.C. 154(b) by 416 days.

(21) Appl. No.: 16/296,404

(22) Filed: Mar. 8, 2019

(65) Prior Publication Data

US 2020/0285767 A1   Sep. 10, 2020

(51) Int. Cl.
*G06F 21/62* (2013.01)
*H04L 9/14* (2006.01)
*H04L 9/08* (2006.01)
*G06F 21/78* (2013.01)
*H04W 12/03* (2021.01)

(52) U.S. Cl.
CPC .......... *G06F 21/6245* (2013.01); *G06F 21/78* (2013.01); *H04L 9/0869* (2013.01); *H04L 9/14* (2013.01); *H04W 12/03* (2021.01); *G06F 2221/2143* (2013.01); *G06F 2221/2151* (2013.01)

(58) Field of Classification Search
CPC ..... H04L 9/14; H04L 9/0869; G06F 21/6245; G06F 2221/2143; G06F 2221/2151; H04W 12/03

USPC ........................................................ 713/193
See application file for complete search history.

(56) References Cited

U.S. PATENT DOCUMENTS

| 8,736,701 B2 | 5/2014 | Marman |
| 9,264,404 B1 | 2/2016 | Lambert |
| 10,071,743 B2 | 9/2018 | Ko |

(Continued)

FOREIGN PATENT DOCUMENTS

| EP | 2936317 A1 | 7/2016 |
| WO | 2014105141 A1 | 7/2014 |

OTHER PUBLICATIONS

NPL Search Terms (Year: 2021).*

(Continued)

*Primary Examiner* — Syed A Zaidi
(74) *Attorney, Agent, or Firm* — Steven M. Bouknight

(57) ABSTRACT

A computer-implemented method for metadata-based retention of personal data may be provided. The method comprises recording data by a recording system. The data comprise payload data and metadata comprising information about the payload data and an event type; and a rule is associated with the event type, wherein the rule is indicative whether the data shall be stored persistently or temporary. The method comprises further segmenting the recorded data into a plurality of non-overlapping data segments, encrypting each data segment of the plurality of non-overlapping data segments with a unique key each, transmitting the encrypted data segments wirelessly, and storing, using a secure service container, selected ones of the plurality of non-overlapping data segments as a function of the rule.

12 Claims, 8 Drawing Sheets

(56) References Cited

U.S. PATENT DOCUMENTS

| | | | |
|---|---|---|---|
| 10,079,931 B2 | 9/2018 | Nicholls | |
| 10,132,616 B2 | 11/2018 | Wang | |
| 2002/0049910 A1* | 4/2002 | Salomon | G06F 21/72 |
| | | | 713/193 |
| 2005/0271251 A1* | 12/2005 | Russell | G06K 9/00771 |
| | | | 382/103 |
| 2007/0174362 A1* | 7/2007 | Pham | G06F 21/80 |
| 2013/0246643 A1* | 9/2013 | Luby | H04N 21/8455 |
| | | | 709/231 |
| 2015/0082349 A1* | 3/2015 | Ishtiaq | H04N 21/4884 |
| | | | 725/40 |
| 2016/0156878 A1 | 6/2016 | Le-Bouedec | |
| 2017/0041454 A1 | 2/2017 | Nicholls | |
| 2017/0142158 A1* | 5/2017 | Laoutaris | H04L 67/02 |
| 2017/0147830 A1* | 5/2017 | Park | G06F 21/10 |
| 2017/0251231 A1 | 8/2017 | Fullerton | |
| 2017/0358207 A1 | 12/2017 | Lopez-Hinojosa | |
| 2018/0084184 A1 | 3/2018 | Boudreau | |
| 2018/0218753 A1 | 8/2018 | Hodge | |
| 2020/0107079 A1* | 4/2020 | Sun | H04N 21/8133 |

OTHER PUBLICATIONS

Anonymous, "Streaming Dash Cameras For Cars", Drive-Safely.net, May 6, 2017, 3 pages, https://www.drive-safely.net/streaming-dash-cameras-for-cars/.

Author Unknown, "Video Evidence A Primer for Prosecutors", Vicro evidence: A Primer for Prosecutors, Issued Oct. 2016, 12 pages, Global Justice Information Sharing Initiative, Bureau of Justice Assistance U.S. Department of Justice, https://it.ojp.gov/GIST/1194/File/Final-Video-Evidence-Primer-for-Prosecutors.pdf/.

Bloom, "Case Study: How Hulu Scaled Serving 4 Billion Videos Using Redis", content.pivatol.io, Nov. 26, 2013, 4 pages, https://content.pivotal.io/blog/case-study-how-hulu-scaled-serving-4-billion-videos-using-redis.

Griffith, "Capabilities of In-Car Video for Police Vehicles", Jul. 21, 2015 [retrieved Aug. 28, 2018], 36 pages, https://www.government-fleet.com/156227/capabilities-of-in-car-video-for-police-vehicles.

Kutscher, et al., "Why films are not allowed in principle", tagesschau.de, May 15, 2018, 11:33, Last printed on Mar. 5, 2019, 2 pages, https://translate.google.com/translate?sl=de&tl=en&u=https%3A%2F%2Fwww.tagesschau.de%2Finland%2Fdashcam-117.html.

Unknown, "Insurers want to use Dashcam videos", tagesschau.de, May 16, 2018, 03:50, 2 pages, Last printed on Mar. 5, 2019, https://translate.google.com/translate?sl=de&tl=en&u=https%3A%2F%2Fwww.tagesschau.de%2Finland%2Fdashcam-versicherer-101.html.

Weissman, "The NYPD's newest technology may be recording conversations", businessinsider, Mar. 26, 2015, 1:05 PM, 4 pages, https://www.businessinsider.com/the-nypds-newest-technology-may-be-recording-conversations-2015-3?IR=T.

* cited by examiner

500

| ID | secretKey | timestamp | type | subType | payload |
|---|---|---|---|---|---|
| dev1 | 2ab2-55ff | 2018-12... | data | video | df21e2a2... |
| dev1 | 2ab2-55ff | 2018-12... | event | impact | NULL |
| ... | ... | ... | ... | ... | ... |

```
dev1 [UUIDhash1] {
                 timestamp : v1,
                 type : {
                     basetype : v2
                     subtype  : v3
                 },
                 payload : v4        ⎫
                 creation time : v5  ⎬ Encrypted
                 }                   ⎭
dev2 [UUIDhash2] ... ... ...
dev3 [UUIDhash2] ... ... ...
...              ...         ...
```

FIG. 6

ACCESS CONTROL OF SPECIFIC ENCRYPTED DATA SEGMENT

BACKGROUND

One embodiment of the invention relates generally to a protection of personalized data, and more specifically to a computer-implemented method for metadata-based retention of personal data. One embodiment of the invention relates further to a data retention system for metadata-based retention of personal data, and a computer program product.

In some jurisdictions, cameras such as those operated in public areas, surveillance systems, private recording systems and other tracking systems recording data are allowed and the recorded information may be used in legal disputes, e.g., a car accident, whereas it may not be allowed to record and store everything visible to a dashcam; however, if available, such information may—at least partially—be used in legal disputes after a car accident. This legal uncertainty has even more weight under the European GDPR (general data protection regulation) regime. In particular, in Germany, an increased usage of dashcams is expected by the German Insurance Association.

On the other side, some police departments in the US are struggling with legal audio surveillance of potential criminal acts in the streets.

Currently, most of the dashcams—or cameras in general—provide ways to store video material in a local buffer inside the camera—or alternatively—in a cloud storage system. Thus, all video material is stored more or less permanently. Normally, a lot of non-relevant content is stored, which may occupy more or less expensive storage space.

SUMMARY

According to one aspect of the present invention, a computer-implemented method for metadata-based retention of personal data may be provided. The method may comprise recording of data by a recording system. The data may comprise payload data comprising information about the payload data, wherein the metadata may also comprise an event type. A rule may be associated with an event type, and the rule may be indicative of persistently storing the data.

The method may also comprise segmenting the recorded data into a plurality of non-overlapping data segments, encrypting each data segment of the plurality of non-overlapping data segments with a unique key, transmitting the encrypted data segments wirelessly, and—in particular after receiving the encrypted data segments—storing, using a secure service container, selected encrypted data segments of the plurality of non-overlapping data segments as a function of the rule.

According to another aspect of the present invention, a data retention system for metadata-based retention of personal data may be provided. The system may comprise a recording system adapted for recording of data, wherein the data comprises metadata and related payload data. The metadata may also comprise an event type. A rule may be associated with the event type, and the rule may be indicative of persistently storing the data.

The system may further comprise a segmenting unit adapted for segmenting the recorded data into a plurality of non-overlapping data segments, an encryption unit adapted for encrypting each data segment of the plurality of non-overlapping data segments with a unique key each, a sender adapted for transmitting the encrypted data segments wirelessly, and a storage system comprising repository in a secure service container—in particular with a receiver—adapted for storing selected ones of the plurality of non-overlapping data segments as a function of the rule.

Furthermore, embodiments may take the form of a related computer program product, accessible from a computer-usable or computer-readable medium providing program code for use by, or in connection with, a computer or any instruction execution system. For the purpose of this description, a computer-usable or computer-readable medium may be any apparatus that may contain means for storing, communicating, propagating or transporting the program for use by, or in connection with, the instruction execution system, apparatus, or device.

BRIEF DESCRIPTION OF THE SEVERAL VIEWS OF THE DRAWINGS

It should be noted that embodiments of one embodiment of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which one embodiment of the invention is not limited.

Figure 1:
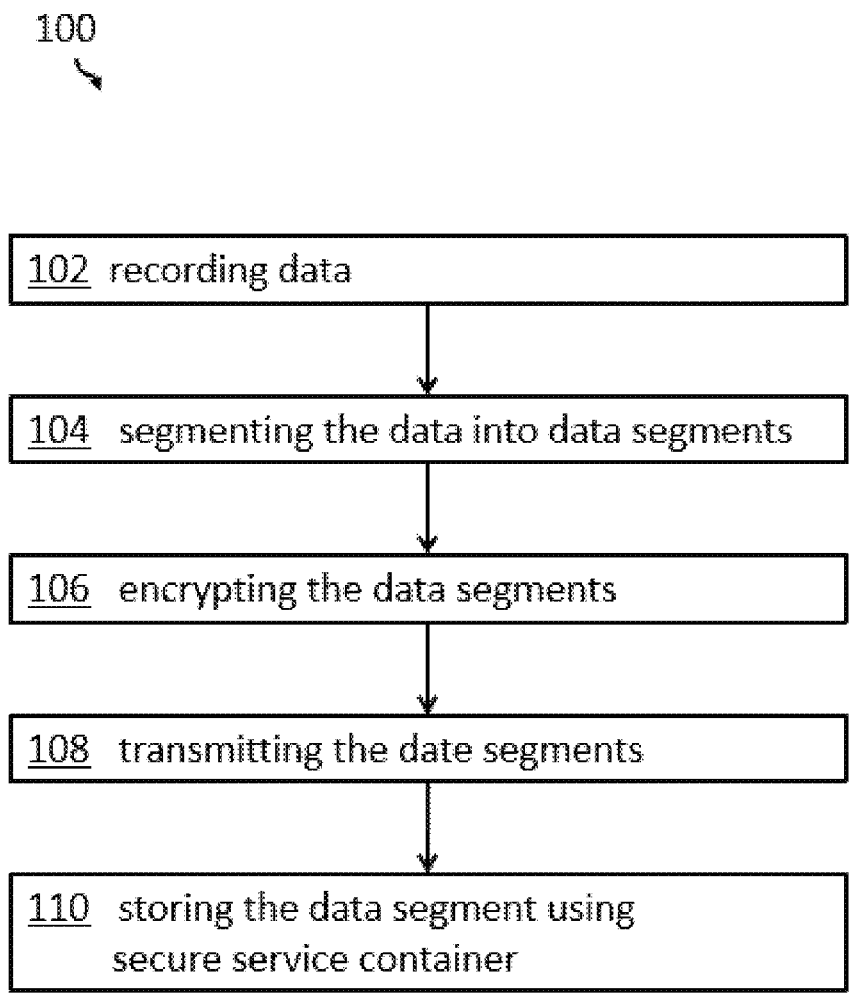

Preferred embodiments of one embodiment of the invention will be described, by way of example only, and with reference to the following drawings:

FIG. 1 shows a block diagram of an embodiment of the inventive computer-implemented method for metadata-based retention of personal data.

Figure 2:
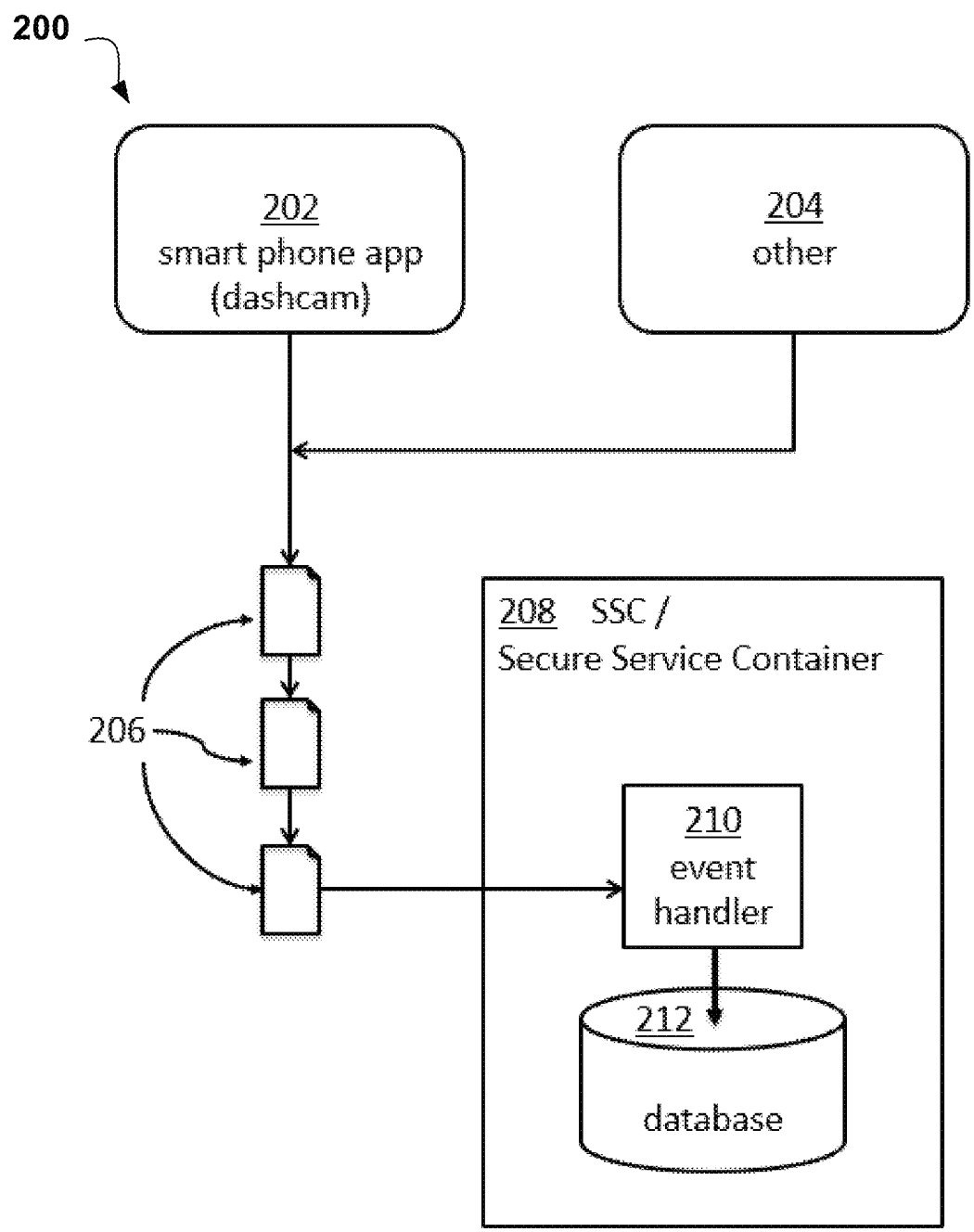

FIG. 2 shows a block diagram of an embodiment of connected units underlying the proposed method.

Figure 3:
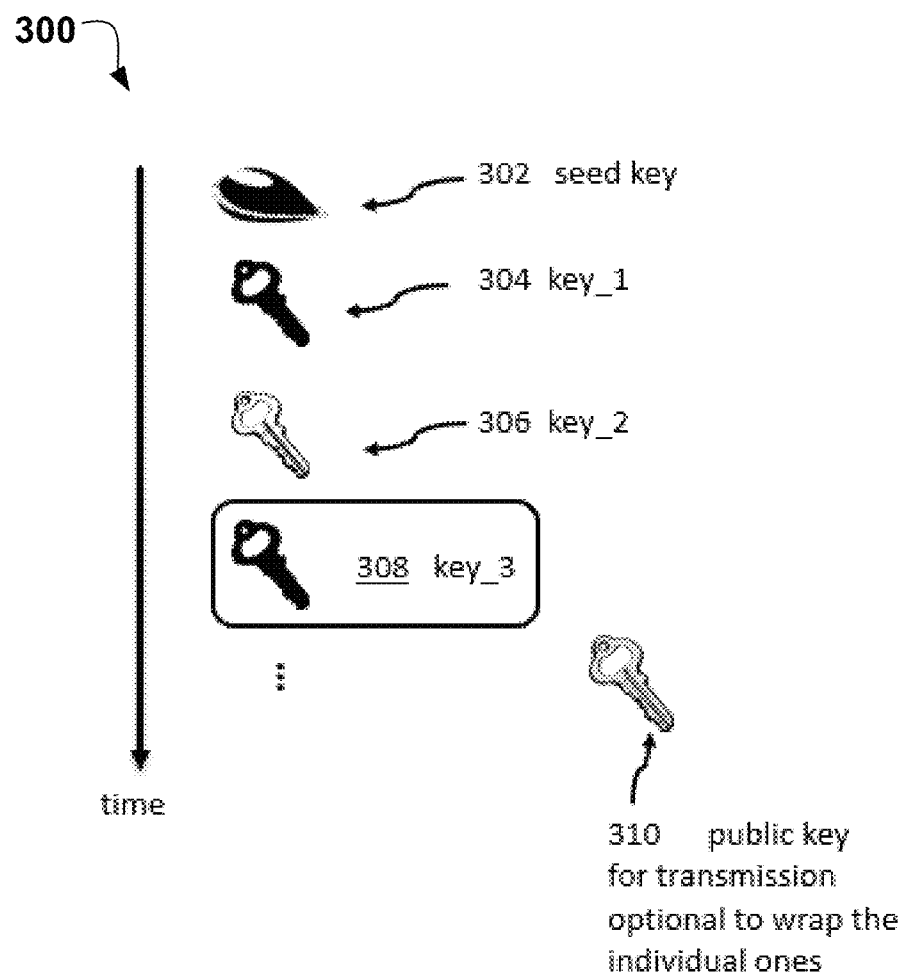

FIG. 3 shows a block diagram of an embodiment of the used key and encryption concept.

Figure 4:
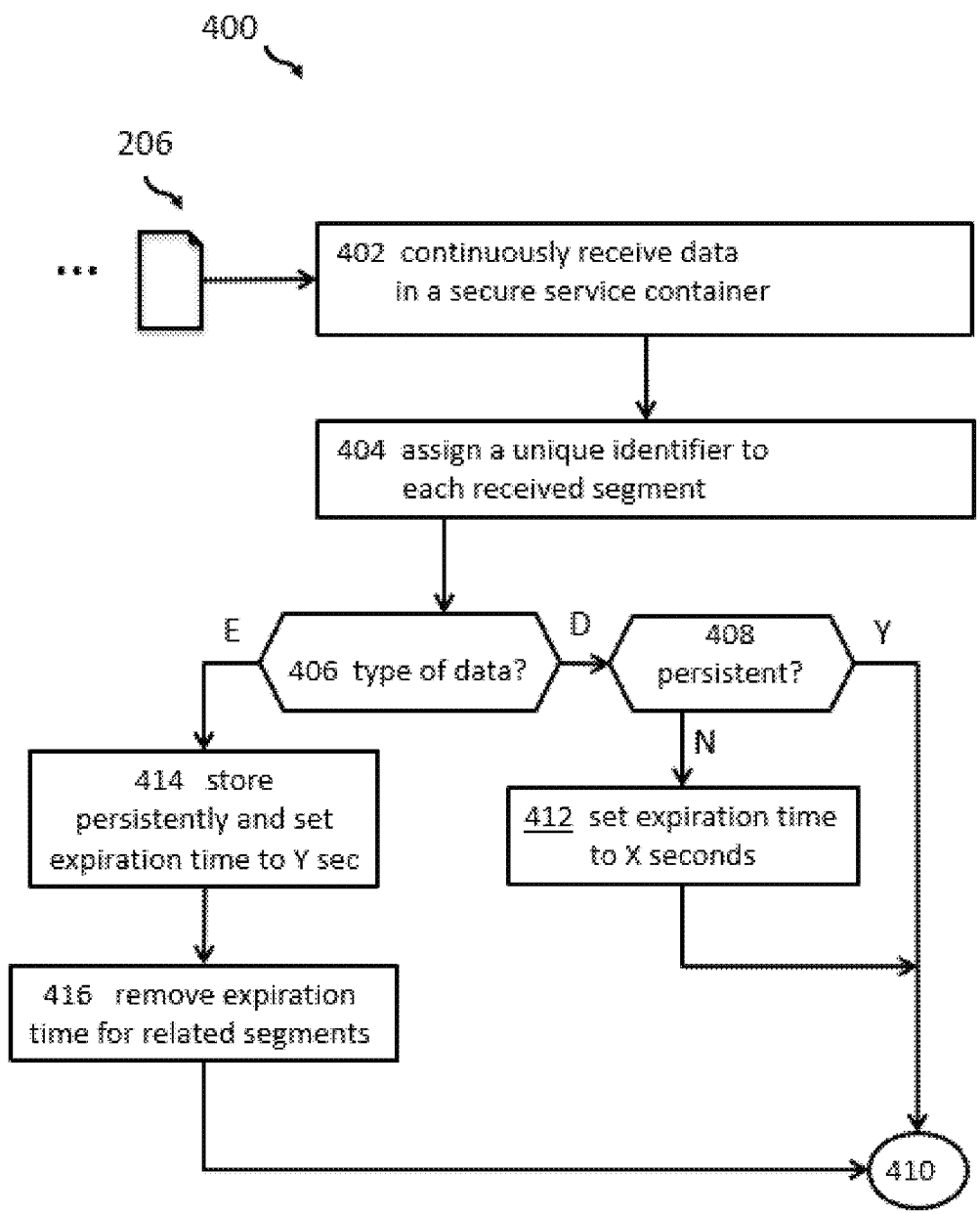

FIG. 4 shows a flowchart of an embodiment of the proposed method and a more detailed form.

FIG. 5 shows an embodiment of a record of the data stream.

FIG. 6 shows an exemplary database repository content.

Figure 7:
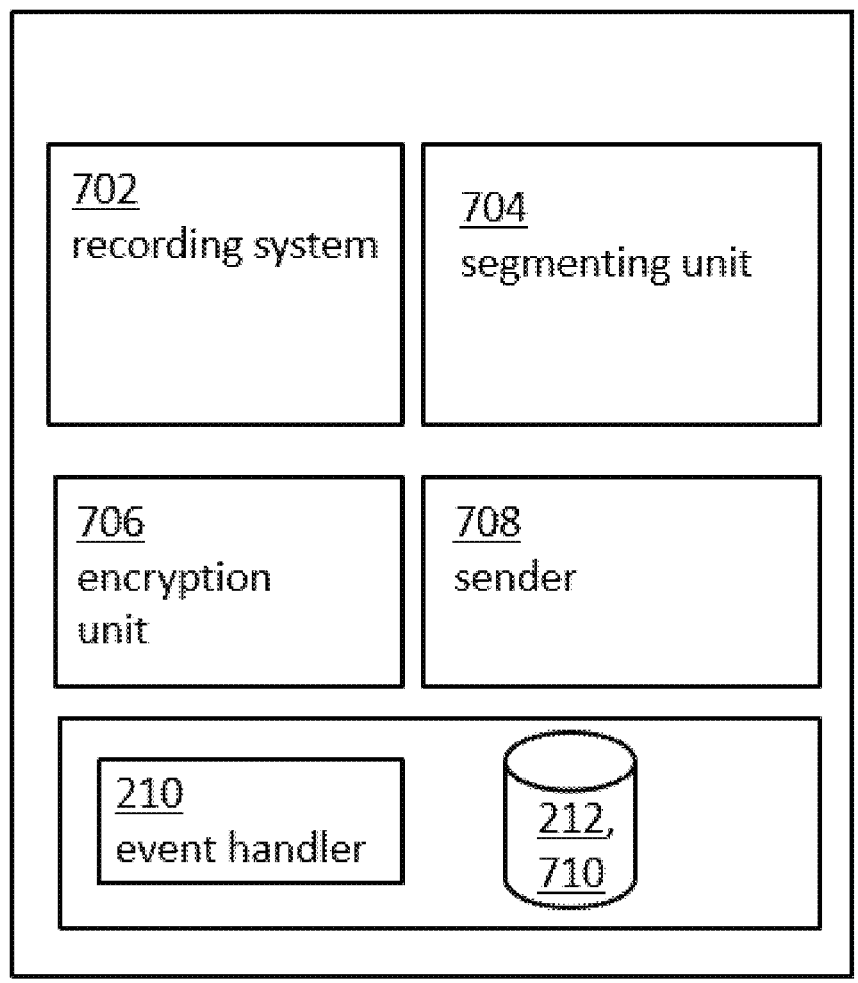

FIG. 7 shows a block diagram of an embodiment of the data retention system computing system.

Figure 8:
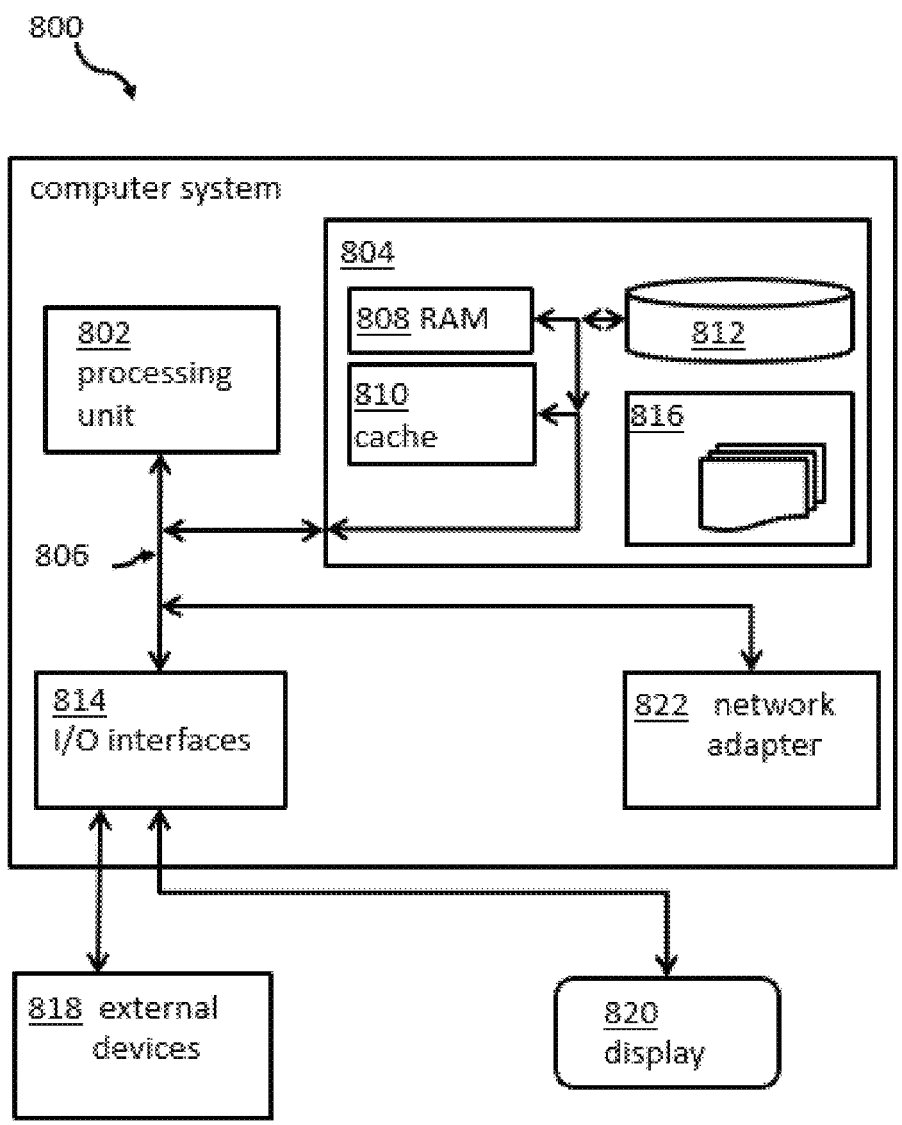

FIG. 8 shows a block diagram of an exemplary computing system instrumental for the execution of the proposed method.

DETAILED DESCRIPTION

In the context of this description, the following conventions, terms and/or expressions may be used:

The term 'recording system' may denote a device that permanently or temporarily stores video, audio or a combined stream of audio/video data. The recording device may be implemented as a smart phone app (application) using a camera of the smart phone or as a dashcam, e.g., installed in a vehicle (car, truck, motorcycle, helm of a skate-boarder, . . . ). Another example of a recording system may be a body camera (bodycam) with a body microphone as part of the equipment of security personnel.

The term 'metadata' may denote data describing a type, an amount, an origin, etc. of payload data. The term is used here in the usual sense of information technology expression.

The term 'payload data' may denote video stream data and/or audio stream data. The payload data may have related metadata describing details about the payload data.

The term 'event type' may denote a specific event that may be detectable like an accident (e.g., heavy impact, slight impact, detected sound of a shot, a crash, or similar). The specific event may also include a detection of a specific sound sample (predeterminable) or a detection of a special image in the video stream.

The term 'rule' may denote what should happen to the received segment in the secure service container, e.g., store the segment persistently or temporarily. The rule may use the event type as a determination basis.

The term 'persistently storing' may denote that the segment data may not receive a comparably low expiration time after which the segment data may be deleted automatically. Alternatively, the expiration time may be set to indefinite indicating that the data should not be deleted.

The term 'event type sensor' may denote a measurement device that measures physical parameter values. A determination unit may derive an event type from a signal(s) for the sensor.

The term 'remote repository' may refer to a database or repository located at a remote location when compared to the location of the recording device. The repository may be managed as part of a secure service container (SSC) in, e.g., a cloud computing center. One example of such a remote repository/database may be a Radis database, which may be the known open source (BSD licensed), in-memory data structure store, often used as a database, cache and/or message broker.

The term ' Secure Service Container' may denote a container concept providing the base infrastructure for an integration of operating system, middleware, and software components into an appliance, which may work autonomously, and which may provide core services and infrastructure focusing on consumability and security. This concept is available for the IBM z/OS® (IBM z/OS and all IBM z/OS-based trademarks and logos are trademarks or registered trademarks of International Business Machines and/or its affiliates) operating system environment. It is set up in a way that it is not required to envision that the system administrator is a trusted person. The secure service container uses available (i.e. available by the operating system) security features without a necessity for code changes. The secure service container may only boot untampered appliances. Data and code may be encrypted in flight and at rest. A system administrator cannot access the memory or processor state. No direct host or operating system level interaction is possible. Only well-defined interfaces into and out of the appliance are available.

The term 'expiration time' may denote here a time period after which a data record may be deleted automatically.

As previously described, the handling of video material from video cameras operated in public areas, surveillance systems, private recording systems and other tracking systems recording data and allowing the recognition of people may be—depending on the legal system in different countries—a difficult undertaking. This may also apply to a recording of street traffic using dashcams, i.e., a video camera mounted on a dashboard and recording other vehicles and pedestrians in front of the car with the mounted dashcam. Due to legal obligations (some are mentioned above), it may become pretty difficult to get the value out of such video content which can have a significant impact in most of the legal disputes. Other techniques, through which larger amounts of video content may be recorded or persistently stored, are those used in video drones or goggles (comprising video cameras).

The proposed computer-implemented method for metadata-based retention of personal data may offer multiple advantages and technical effects:

The segmentation of the continuously recorded video content may allow a continuous encryption of the stream of segments with different keys. Thus, if a key is known for one of the segments, the stored content of this segment may be decrypted but the content of other segments cannot be decrypted. Thus, a continuous data-stream may be recorded and segment-wise encrypted but may only be available as individual segments with individual decryption keys. Hence, most or all of the legal and regulatory requirements may be addressed with this technique.

In addition, the keys for the various segments can be generated completely automatically from a seed key.

Furthermore, by identifying a specific event, the specific event type may be determined and may be stored as part of metadata relating to the video content in a repository remote to the recording system. Because of a time-stamping of the individual segments of data streamed, it may become possible to decrypt only selected ones of the sequences of the video material just before the event happened. This way, it may become possible to reconstruct the series of activities just before the event—e.g., a car accident, or a shot automatically determined by the recording and detection system—supporting other types of investigations because of the segment-wise decryption of the recorded data stream and privacy regulations (e.g., European GDPR) may be reflected.

An event sensor type may be used that can be activated to identify and recognize a particular type of event. The segmentation may also allow for a segment-wise deletion of the video content freeing up storage space in the repository which may help to reduce the cost for operating the inventive system.

By handling and matching the data segments initially as only temporary data, and automatic deletion after a predefined period of time may not be a problem at all. However, the event type may change the status of a specific data stream content from temporary to persistent. The automatic deletion process may not be applicable to a segment protected in such a way.

It may also be possible to store a plurality of segments in the recorder until a wireless connection between the recorder and the remote repository can be restored. Thus, a temporary unavailability of a mobile connection may not undermine the general concept of the proposed method and/or system.

According to one possible embodiment of the method, the data may be an audio stream and/or a video stream. Also a combined audio/video stream is possible. The audio stream may be recorded using a microphone and an audio recorder with a microphone of any type. The video stream may be recorded by a traditional video recorder or a dashcam which may be mounted in a vehicle. This way a continuous recording of traffic information in front of a vehicle—a private car, a taxi, a police car, etc. —may be possible.

Also, a storage system inside the recording device may be used only if the wireless connection is not possible. In this case, the recorded data may be stored temporarily in the recording device in a ring-like structure, overwriting always in the oldest data segments.

According to one preferred embodiment of the method, the event type may be determined while recording the data. A special sensor may be used to detect a physical parameter value from which the event type may be derived from. A special determination analyzer unit may be used in this process. The event type may be determined by an event type sensor. Examples of such a sensor are presented by the group: an accelerator sensor, a crash sensor, a specific spoken word/expression, a sound sample (shot), or any other device being adapted to determine a physical event from which a current and specific situation, i.e., the event type, may be derived from.

According to one advantageous embodiment of the method, storing selected ones of the plurality of non-overlapping data segments may also comprise storing the encrypted data in a remote repository depending on the at least one rule. The rule may be predefined and may be available to the processing unit connected to the repository for a decision on whether the received data segment should be stored temporarily or persistently. An event for determining applying the rule may also be located within the secure service container.

According to a useful embodiment, the method may also comprise setting a first expiration time for a data segment in the repository if the metadata for the segment does not comprise an event type indication. After this first expiration time, the related data segment may be deleted automatically.

According to another useful embodiment, the method may also comprise setting a second expiration time for a data segment in the repository if the metadata for the data segment does comprise an event type indication. It may be useful that the second expiration time may be longer or much longer than the first expiration time (even indefinite). The second expiration time may define the time users may access the segment after the event happened. Thus, a specific data segment may not be deleted after a short period of time.

According to one advantageous embodiment, the method may also comprise removing the expiration time of data segments comprising the same device identifier in the metadata as the data segment in the repository comprising the event type identifier. Instead of the device identifier, also a user identifier may be used (or a combination). The special embodiment may ensure that critical scenes before an event happens may be made available to the user after the event happened. However, it may also be ensured that not any data segment which is older than the first expiration time can be made available.

According to additional an embodiment, the metadata for each segment may comprise at least one selected out of the group comprising a time stamp, geographical coordinate values —e.g., from a global positioning system/GPS—a speed value or also a plurality of velocity values per segment of the recording device (the speed value may be derived from a speedometer), an acceleration value (from a g-device) of, e.g., the recording device, a recording identifier, a data type identifier of the payload, an event type value or event type identifier.

According to a permissive embodiment of the method, the data may be personal sensitive data, in particular data having information about people and their actions.

According to a further preferred embodiment of the method, the encryption keys for the data segments may be generated from a seed key. The encryption keys may be private keys, either symmetrical or asymmetrical keys. Additionally, they may be wrapped using a public/private key mechanism for the transmission to the cloud repository center.

In the following, a detailed description of the figures will be given. All instructions in the figures are schematic. Firstly, a block diagram of an embodiment of the inventive computer-implemented method for metadata-based retention of personal data is given. Afterwards, further embodiments, as well as embodiments of the data retention system for metadata-based retention of personal data, will be described.

FIG. 1 shows a block diagram of an embodiment of the computer-implemented method 100 for metadata-based retention of personal data. The method 100 comprises recording 102 of data—e.g., a video stream, an audio stream or a combination thereof—by a recording system. The data comprise payload data and metadata comprising information about the payload data and the metadata comprising an event type. A rule—in particular at least one rule—is associated with an event type. The rule may indicate that the data should be stored either temporarily or persistently.

The method 100 comprises segmenting at 104 the recorded data into a plurality of non-overlapping data segments, in particular a plurality of time-wise non-overlapping segments. The method 100 also comprises encrypting at 106 each data segment of the plurality of non-overlapping data segments with a unique key. The sequence of required keys may be automatically derivable from a seed key. Thus, each encrypted data segment requires a specific decryption key which cannot be used for any other data segment for decryption.

Furthermore, the method 100 comprises transmitting at 108 the encrypted data segments wirelessly, in particular to a remote repository, e.g., a cloud computing center, and storing at 110 selected ones of the plurality of non-overlapping data segments as a function of the rule, i.e., dependent or based on the rule. The storing will happen in an environment of a secure service container. The type of storing of the data segments may be determined by an event handler which may also be secured within the secure service container.

FIG. 2 shows a block diagram of an embodiment of connected units 200 underlining the proposed method. A recording device or another device 204 generates a data stream comprising different segments 206. The segments have been generated in the recording device or another device 204. The recording device might be any data recording device, in particular, a smartphone app 202, a dashcam in a car, or a drone—e.g., a quatrocopter—an audio recorder (e.g., in form of a speech recorder or similar). The segments of data 206 may be transmitted—in particular wirelessly—from the recording device 202, 204 to a remote secure service container 208 in a computing center operating an event handler 210 connected to a database for storing the received data segments temporarily or persistently. As an example, the known Redis® database (Redis and all Redis-based trademarks and logos are trademarks or registered trademarks of Redis and/or its affiliates) is shown because it comprises some features useful for the proposed concept. However, also any other database may be suitable for the proposed concept.

It may be noted, that the secure service container may be a useful feature to protect the processing of the received encrypted data segments as well as the data in the database.

FIG. 3 shows a block diagram 300 of an embodiment of the used key and encryption concept. A seed key 302 may be used as a source to automatically generate derived keys, like the keys key_1 304, key_2 306, or key_3 308. Additionally an exemplary key_3 308 is shown in a box representing an additional encryption (or secure wrapping) of the key_3 308. A public key 310 may be used for a transmission of the keys to the remote repository if required. The public key may be one part of a public/private key pair used for an encryption/decryption of the segment keys 304, 306, 308, etc. This way, the key generation for the different segments may be handled completely automatically as part of the recording device.

FIG. 4 shows a flowchart 400 of an embodiment of the proposed method in a more detailed form. A front-end application/data recorder (not shown) may send data 2—in particular wirelessly—by separating a data stream into separate segments 206 encrypted with a unique encryption key each. An event handler (compare FIG. 2) continuously receives, 402—e.g., via SSL/TCP—the data from one or more recording devices (which may be related to one or more users). The event handler is running in a secure service container (SSC) environment.

The event handler assigns at 404 a unique identifier to each segment received. The unique identifier may be a combination of a recording device identifier and another unique value, e.g., a step-by-step increased counter value.

After that, it is determined 406 whether the received segment relates to data "D" or an event "E". In case of data, it is determined, 408, whether a mark for a persistent entry of the data is set. If that is the case, the process ends, 410.

If the persistent mark is not set—case "N"—optionally, 500 in exploration time of X seconds is set at 412 for the data segment, and the data segment is stored in the database (not shown, compare FIG. 2).

If during the determination, whether the received data segment is of type event or data, it is determined that the data segment type is "E" (i.e., event), the segment is stored at 414 persistently and an expiration time is set to Y seconds. Thereby, it is useful that Y>>X. Additionally, a query is run to identify database entries associated with the just processed segment—i.e., belonging to the same device/user—and the expiration time of these segments is removed at 416. After that, the process ends at 410.

FIG. 5 shows an embodiment of a record or segment 500 of the data stream. The record may comprise an identifier, e.g., for the use recording device (eventually, expanded by a constantly increasing integer), a secret key, a timestamp (date and time), a data type (payload data type, or event data type), a subtype for the data (video/audio or e.g., impact), and payload data.

FIG. 6 shows an exemplary database repository content 600 which is—more or less—self-explanatory. It may be noted that the device ID (identifier) may be a hash value of a related UUID (universal unique identifier). It may also be noted that the payload data, having the value v4, is encrypted. The values v1, v2, v3, v5 are values and the form of the related parameters (timestamp, baseType, subtype, creation time/timestamp). It may be noted that the timestamp of the segment and time stamp of creation time may be different. This may be because it may happen that the wireless transmission from the recording device to the secure service container (compare FIG. 2) cannot happen at any time. In such a case, the data stream may be cashed in the recording device with respective timestamps. After a wireless connection may be available again, the data may be transmitted to the secure service container and potentially entered into the repository/database with a creation time for the entry in the repository/database.

FIG. 7 shows a block diagram of an embodiment of the data retention system 700. The system 700 comprises a recording system 702 adapted for a recording of data. The data comprise payload data and metadata comprising information about the payload data. The metadata comprise also an event type. Additionally, a rule is associated with an event type; and the rule indicates whether a data segment should be stored persistently or temporarily.

The system 700 comprises also a segmenting unit 704 adapted for segmenting the recorded data into a plurality of non-overlapping data segments, an encryption unit 706 adapted for encrypting each data segment of the plurality of non-overlapping data segments with a unique key each, a sender 708 adapted for transmitting the encrypted data segments wirelessly, a repository 710 (database, compare 212, FIG. 2) adapted for storing selected ones of the plurality of non-overlapping data segments as a function of the rule. The repository 710 may be stored in a storage system executed as part of a secure service container which may also be used for the event and to open current (compare FIG. 2).

Embodiments of one embodiment of the invention may be implemented together with virtually any type of computer, regardless of the platform being suitable for storing and/or executing program code. FIG. 8 shows, as an example, a computing system 800 suitable for executing program code related to the proposed method.

The computing system 800 is only one example of a suitable computer system and is not intended to suggest any limitation as to the scope of use or functionality of embodiments of one embodiment of the invention described herein, regardless, whether the computer system 800 is capable of being implemented and/or performing any of the functionality set forth hereinabove. In the computer system 800, there are components, which are operational with numerous other general purpose or special purpose computing system environments or configurations. Examples of well-known computing systems, environments, and/or configurations that may be suitable for use with computer system/server 800 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 800 may be described in the general context of computer system-executable instructions, such as program modules, being executed by a computer system 800. Generally, program modules may include routines, programs, objects, components, logic, data structures, and so on that perform particular tasks or implement particular abstract data types. Computer system/server 800 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 800 is shown in the form of a general-purpose computing device. The components of computer system/server 800 may include, but are not limited to, one or more processors or processing units 802, a system memory 804, and a bus 806 that couple various system components including system memory 804 to the processor 802. Bus 806 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 800 typically includes a variety of computer system readable media. Such media may be any available media that is accessible by computer system/server 800, and it includes both, volatile and non-volatile media, removable and non-removable media.

The system memory 804 may include computer system readable media in the form of volatile memory, such as random access memory (RAM) 808 and/or cache memory 810. Computer system/server 800 may further include other removable/non-removable, volatile/non-volatile computer system storage media. By way of example only, a storage system 812 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 806 by one or more data media interfaces. As will be further depicted and described below, memory 804 may include at least one program product having a set (e.g., at least one) of program modules that are configured to carry out the functions of embodiments of one embodiment of the invention.

The program/utility, having a set (at least one) of program modules 816, may be stored in memory 804 by way of example, and not limiting, as well as an operating system, one or more application programs, other program modules, and program data. Each of the operating systems, one or more application programs, other program modules, and program data or some combination thereof, may include an implementation of a networking environment. Program modules 816 generally carry out the functions and/or methodologies of embodiments of one embodiment of the invention, as described herein.

The computer system/server 800 may also communicate with one or more external devices 818 such as a keyboard, a pointing device, a display 820, etc.; one or more devices that enable a user to interact with computer system/server 800; and/or any devices (e.g., network card, modem, etc.) that enable computer system/server 800 to communicate with one or more other computing devices. Such communication can occur via Input/Output (I/O) interfaces 814. Still yet, computer system/server 800 may communicate with one or more networks such as a local area network (LAN), a general wide area network (WAN), and/or a public network (e.g., the Internet) via network adapter 822. As depicted, network adapter 822 may communicate with other components of the computer system/server 800 via bus 806. It should be understood that, although not shown, other hardware and/or software components could be used in conjunction with computer system/server 800. Examples include, but are not limited to: microcode, device drivers, redundant processing units, external disk drive arrays, RAID systems, tape drives, and data archival storage systems, etc.

The descriptions of the various embodiments of the present invention have been presented for purposes of illustration but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of one embodiment of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit one embodiment of the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description but is not intended to be exhaustive or limited to one embodiment of the invention in the form disclosed. Many modifications and variations will be apparent to those of ordinary skills in the art without departing from the scope and spirit of one embodiment of the invention. The embodiments are chosen and described in order to best explain the principles of one embodiment of the invention and the practical application, and to enable others of ordinary skills in the art to understand one embodiment of the invention for various embodiments with various modifications, as are suited to the particular use contemplated.

What is claimed is:

1. A computer-implemented method for metadata-based retention of personal data, the method comprising:
   recording data by a recording system, wherein the data comprises metadata and payload data, the metadata comprising information about the payload data and the metadata comprising an event type, wherein a rule is associated with the event type, and wherein the rule indicates that the data is persistently stored;
   segmenting the recorded data into a plurality of non-overlapping data segments;
   encrypting each data segment of the plurality of non-overlapping data segments with a unique key, wherein the unique key for each data segment is different than all other unique keys of the other data segments from the plurality of non-overlapping data segments;
   transmitting the encrypted data segments wirelessly;
   storing, using a secure service container, selected encrypted data segments of the plurality of non-overlapping data segments as a function of the rule, wherein storing the selected encrypted data segments comprises storing the encrypted data segments in a remote repository depending on the rule;
   setting a first expiration time for the encrypted data segments in the remote repository in response to the metadata for the encrypted data segments not comprising an event type indication;

setting a second expiration time for the encrypted data segments in the remote repository in response to the metadata for the encrypted data segments comprising an event type indication; and removing the second expiration time of the encrypted data segments comprising a same device identifier in the metadata as the encrypted data segments in the remote repository comprising an event type identifier.

2. The method according to claim 1, wherein the data is selected from a group comprising an audio-stream and a video-stream.

3. The method according to claim 1, further comprising: determining the event type while recording the data.

4. The method according to claim 1, further comprising: determining the event type by an event type sensor.

5. The method according to claim 1, wherein the metadata for each of the encrypted data segments comprise at least one selected from a group comprising a time stamp, geographical coordinates values, a speed value of the recording device, an acceleration value of the recording device, a recording identifier, a data type identifier of the payload, an event type value.

6. The method according to claim 1, wherein the data comprises sensitive data.

7. The method according to claim 1, wherein encryption keys for the encrypted data segments are generated from a seed key.

8. A computer system for metadata-based retention of personal data, the computer system comprising:

one or more processors, one or more non-transitory computer-readable memories, and program instructions stored on at least one of the one or more non-transitory computer-readable memories for execution by at least one of the one or more processors, wherein the computer system is capable of performing a method comprising:

recording data, wherein the data comprises payload data and metadata comprising information about the payload data, wherein the metadata comprises an event type, wherein a rule is associated with the event type, and wherein the rule indicates that the data is persistently stored;

segmenting the recorded data into a plurality of non-overlapping data segments;

encrypting each data segment of the plurality of non-overlapping data segments with a unique key, wherein the unique key for each data segment is different than all other unique keys of the other data segments;

transmitting the encrypted data segments wirelessly;

storing selected encrypted data segments of the plurality of non-overlapping data segments as a function of the rule, wherein storing the selected encrypted data segments comprises storing the encrypted data segments in a remote repository depending on the rule;

setting a first expiration time for the encrypted data segments in the remote repository in response to the metadata for the encrypted data segments not comprising an event type indication;

setting a second expiration time for the encrypted data segments in the remote repository in response to the metadata for the encrypted data segments comprising an event type indication; and removing the second expiration time of the encrypted data segments comprising a same device identifier in the metadata as the encrypted data segments in the remote repository comprising an event type identifier.

9. The computer system according to claim 8, wherein the data is an audio-stream and/or a video-stream.

10. The computer system according to claim 8, further comprising:

determining the event type while recording the data.

11. The computer system according to claim 10, further comprising:

determining the event type by an event type sensor.

12. A computer program product for metadata-based retention of personal data, the computer program product comprising a non-transitory computer readable storage medium having program instructions embodied therewith, the program instructions being executable by one or more computing systems or controllers to cause the one or more computing systems to:

record data by a recording system, wherein the data comprises metadata and payload data, the metadata comprising information about the payload data and the metadata comprising an event type, wherein a rule is associated with an event type, and wherein the rule indicates that the data is persistently stored;

segment the recorded data into a plurality of non-overlapping data segments;

encrypt each data segment of the plurality of non-overlapping data segments with a unique key, wherein the unique key for each data segment is different than all other unique keys of the other data segments;

transmit the encrypted data segments wirelessly;

store, using a secure service container, selected encrypted data segments of the plurality of non-overlapping data segments as a function of the rule, wherein storing the selected encrypted data segments comprises storing the encrypted data segments in a remote repository depending on the rule;

setting a first expiration time for the encrypted data segments in the remote repository in response to the metadata for the encrypted data segments not comprising an event type indication;

setting a second expiration time for the encrypted data segments in the remote repository in response to the metadata for the encrypted data segments comprising an event type indication; and removing the second expiration time of the encrypted data segments comprising a same device identifier in the metadata as the encrypted data segments in the remote repository comprising an event type identifier.

* * * * *